Jan. 2, 1940.  E. C. RYAN  2,185,270
CURRENT COLLECTING DEVICE
Filed Oct. 5, 1938
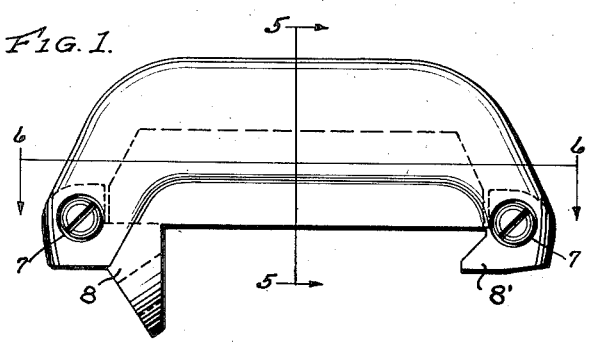
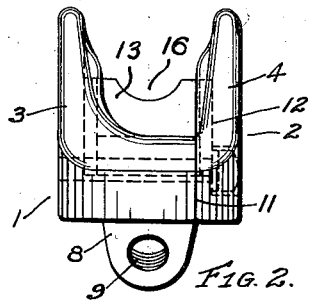
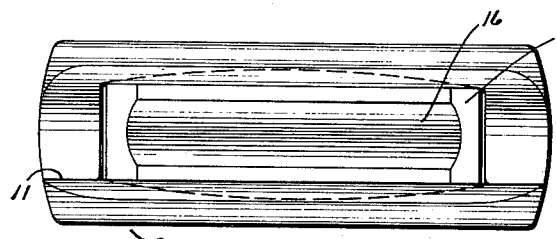
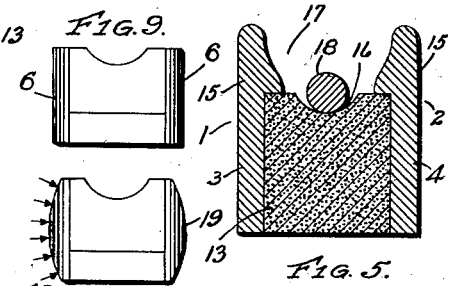
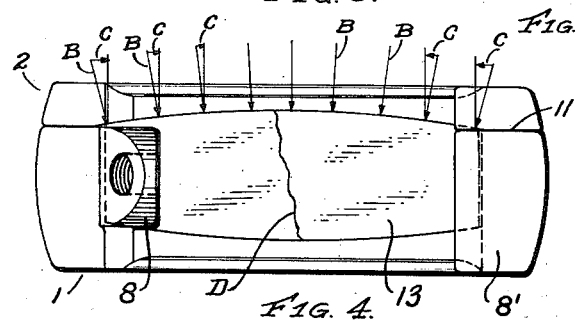
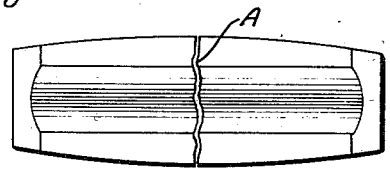
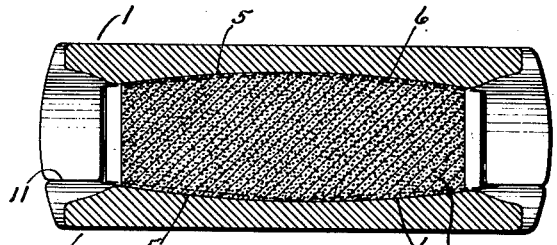
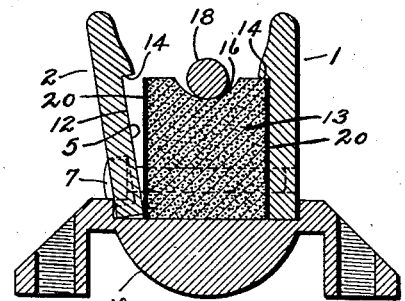
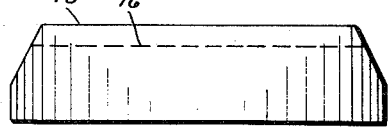
Inventor
EDMUND C. RYAN
By
Attorney Patented Jan. 2, 1940

2,185,270

UNITED STATES PATENT OFFICE 2,185,270

CURRENT COLLECTING DEVICE

Edmund C. Ryan, Mansfield, Ohio, assignor to The Ohio Brass Company, Mansfield, Ohio, a corporation of New Jersey Application October 5, 1938, Serial No. 233,418

21 Claims. (Cl. 191—59.1)

My invention relates to current collecting devices, and has particular reference to those devices for gathering current from an overhead trolley wire for use in connection with trolley buses and other electrically operated vehicles.

One object of my invention is to provide a collector using a carbon insert to contact with the trolley wire.

Another object is to provide a holder for the carbon or other insert whereby the carbon or insert may be renewed without removing the holder from its support.

Another object of my invention is to construct the insert and the holder in such manner that they will cooperate to prevent longitudinal movement of the insert relative to the holder, especially if the insert be of carbon or other fragile material and should break transversely into two or more parts during use.

Another object is to so relate the insert and holder that they will cooperate to maintain the insert in its normal longitudinal position relative to the holder.

A further object of my invention is to construct the holder and insert relative to each other that it will not be necessary to provide a close fit between the holder and the ends of the insert.

Still another object of my invention is to provide a carbon insert which is less susceptible to breakage than those of the past.

My invention resides in the new and novel construction, combination, and relation of the parts herein described and shown in the drawing accompanying this specification.

In the drawing:

Fig. 1 is a side view in elevation of my shoe.

Fig. 2 is an end view of Fig. 1 looking toward the left-hand end of Fig. 1.

Fig. 3 is a top plan view of Fig. 1.

Fig. 4 is a bottom plan view of Fig. 1.

Fig. 5 is a transverse view in section taken on the line 5—5 of Fig. 1.

Fig. 6 is a horizontal section taken on the line 6—6 of Fig. 1.

Fig. 7 is a top plan view of my improved carbon insert showing a central transverse crack as sometimes occurs.

Fig. 8 is a side view in elevation of Fig. 7.

Fig. 9 is an end view of Fig. 8.

Fig. 10 is an end view of a modified form of insert in which the side walls are curved vertically or upwardly of the insert.

Fig. 11 shows a central transverse sectional view of my invention mounted upon a support shown in section and also showing the manner in which the insert may be removed from the holder in case of replacement of the insert. This figure also shows a modification of the insert shown in the other figures.

The carbon insert in connection with its holder is a considerable advance in the art over a holder employing a metal insert.

The principal advantage of a collector shoe using a carbon insert lies in the fact that the carbon has a very beneficial action on the trolley wire in that it produces a smooth, polished surface and does not wear the trolley wire rapidly. The carbon itself has a greater specific hardness than that of the wire and for this reason the insert must be designed so as to not offer any cutting edges which might score or be the cause of undue wear of the wire.

In use it has been found that the carbons often crack transversely due to blows received as the shoes travel through special overhead work such as, frogs, switches, etc., and that the adjacent edges of these fractures tend to separate thus causing a sharp wire-cutting edge to be formed at the center of the insert, as shown at A in Fig. 7.

In order to preserve a smooth surface of carbon in contact with the trolley wire, there are two important things which should be done; namely, either the breakage of the carbon should be eliminated, or the harmful effects of the cracking should be eliminated or both as far as possible, and this can be done by providing means for preventing the separation of the edges of the carbon at the line of fracture.

The first of these methods at the present time does not seem possible as the development of carbon suitable for use as a current collector under the conditions which must be met in practical operations has not reached a point where such cracking is eliminated.

This leaves one with the second possibility, namely, to prevent the edges of the fracture from separating to produce cutting edges. There are two practical methods for accomplishing this, namely, either to make the insert of such a length and shape as to fit snugly in the slot provided for it in the holder so as to prevent all longitudinal movement, or to provide some method whereby the pressure between the holder and insert will be such as to exert an automatic centering effect longitudinally and have this centering effect act along the entire length of the carbon that the edges of a fracture will not separate regardless of where the fracture occurs.

To make the carbon insert fit snugly against the ends of the slot to prevent longitudinal movement of the carbon relative to the holder, is found to be quite expensive.

I have found a practical way of maintaining the insert in the holder whereby no separation of the edges of a fracture will occur should the break occur either transversely or longitudinally of the carbon.

I employ what I term a "boat-shaped" insert in which the side faces are convexly curved in the longitudinal direction but are otherwise parallel, as shown in Figs. 7 and 9 respectively or as shown in Fig. 10.

The insert is secured in the holder by side pressure which prevents the parts of the insert from separating if a longitudinal fracture occurs. The holder is formed of two members 1 and 2 having side walls 3 and 4 respectively and the inner faces 5 of these side walls are shaped to correspond to the curvature of the side walls 6 of the carbon insert. The members 1 and 2 are capable of being drawn into engagement with the insert by means of the screws 7.

By curving the side walls of the insert as described and the cooperating faces of the walls 3 and 4 and by clamping the insert tightly between the members 1 and 2, the pressure exerted on the carbon is not merely a straight transverse pressure as would be the case with a rectangular insert having parallel faces, but the pressure will vary over the entire length of the insert as shown by the force lines B in Fig. 4.

These force lines are normal to the contacting surfaces 5 and 6. There is also a resultant due to the force B which is longitudinal of the insert and acting toward the center of the insert parallel to the longitudinal axis and such resultant forces are indicated as C and their magnitude depends upon the curvature of the faces 5 and 6 and the pressure applied thereto by the holder.

It will thus be seen from Fig. 4 that should a fracture D occur the resultant forces C acting on the left-hand end of the insert will tend to prevent the left-hand end of the insert from moving to the left and likewise the resultant forces acting upon the right-hand end of the insert will prevent its moving to the right, or in other words the tendency of these resultant forces will be to move the ends of the insert on each side of the fracture toward each other thus tending to hold the faces of the fracture in contact with each other, thus preventing an open crack as shown at A in Fig. 7.

It is found that by constructing the insert and holder as described that the longitudinal forces C actually tend to compress and hold the carbon more firmly longitudinally and thus give it more strength and resistance to breakage. Thus the "boat-shape" given to the carbon insert and the cooperating holder not only makes the separation of the edges of any fractures which may occur either transversely or longitudinally quite impossible but it also reduces materially the tendency of such cracking.

The above is also true if the side faces 5 and 6 are straight as shown by the dotted lines in Fig. 6 in place of curved.

A further description of the construction of my improved shoe now follows:

The member 1 is provided with a downwardly projecting hook 8' and a lug 8 which has a threaded opening 9 to receive means for holding the shoe to a support. I am not showing a support in detail, as I make use of the support shown in Larsson Patent 2,044,886, issued June 23, 1936, a portion of which support is shown at 10 in Fig. 11.

The members 1 and 2 are parted along the longitudinal line 11 and when these members are clamped into position they form an open top and open bottom receptacle 12 in which is positioned the carbon or other insert 13. The side walls 3 and 4 have on their inner surfaces a projecting longitudinal shoulder 14 which overlaps the upper face of the carbon to assist in holding the same against upward displacement should the members 1 and 2 become inadvertently loose. The member 1 has a side wall and two end walls which form a receptacle open on top, bottom and one side but which is closed when the member 2 is in position.

In order to renew the carbon 13 when necessary, it requires only the loosening of the screws 7 sufficiently to permit the side member 2 to be tilted or moved directly sideways, depending upon the type of support 10, as shown in Fig. 11.

The members 1 and 2 are provided with upwardly projecting flanges 15 which together with the upper surface of the insert 13 and longitudinal groove 16 therein forms a longitudinal groove 17 which prevents dewirement of the shoe.

I prefer to groove longitudinally the upper surface of the insert 13 which will receive the trolley wire 18 and immediately center the shoe with respect to the trolley wire so that the flanges 15 do not engage with the trolley wire and, therefore, the holder, which is formed of metal, does not contact with the trolley wire and hence the wear upon the holder is a minimum.

In Fig. 10 I show a modification of the insert in that the side walls 19 are convexed in a vertical or upward direction in place of being parallel as in the case of Fig. 9. This also has the same effect in tending to stiffen and retain the insert in position as in the case of the curved side walls 5.

It will be evident that the insert 13 may have side walls curved as shown in Fig. 6 in combination with the curvature shown in Fig. 10, or as already described the insert may have the side faces curved as shown in Fig. 6, but vertically straight and parallel as shown in Fig. 9. Also, if desired, the side walls may be longitudinally parallel as in the case of a rectangular shaped body with the side walls curved as shown at 19 in Fig. 10.

The term "carbon insert" applies to an insert made of natural graphite, coke, synthetic graphite as made in the electric furnace, etc., or a mixture of the various forms of carbon, or to an insert made of a mixture of carbon and a metal in which the ingredients may be uniformly dispersed.

The terms, vertical, upward, upper, bottom, top, etc., apply to the parts as positioned in use as in Figs. 1 and 2.

It is sometimes desirable to have a yielding cushion interposed between the insert faces and the adjacent faces on the holder in order to more evenly distribute the pressure between the insert and the holder and also to hold the parts of the insert together in case the insert is removed before it is completely worn out and should the insert have become broken as sometimes happens, if the insert is of carbon or graphite, due to the knocks to which the insert is subjected in passing through special overhead devices.

This cushion may consist of a substantial coating of a soft yieldable metal such as lead, applied to the side and end faces of the insert and to the bottom face if desired, the coating being applied so as to form an integral part of the insert.

The metal coating may be applied readily by a gun for spraying metal in a fine mist as by the Shoop process. If the coating is of lead which is soft and ductile and is applied to a carbon insert which is quite hard and brittle, the carbon may crack and shatter from rough service but the lead coating of substantial thickness will not crack or break and hence will retain the parts of the fractured insert in their original relative positions.

Other suitable metals such as copper, tin, etc. may be used to secure different results. The contact resistance between the insert and the holder is considerably less when a yielding metallic cushion is interposed between the insert and the holder.

The cushion may consist of a layer of non-metallic products such as finely pulverized graphite or carbon in a binder such as rubber cement. This however is not preferable to the lead coating as the resistance of this product is much higher than that of a metal coating but it is more yielding to pressure.

In Fig. 11 I have shown a coating 20 on each side face of the insert 13 and the use of which coating is optional. The coating 20 may extend across the end faces of the insert and may be applied to the lower face also.

Other modifications will suggest themselves to those skilled in the art from my disclosure herein set forth, and, therefore, I wish to be limited only by my claims.

I claim:

1. A current collector shoe comprising a holder and a carbon insert, the holder comprising a pair of elongated members forming a longitudinal recess having closed sides and ends and open top, means to draw the parts together, the inner opposite faces of the side walls being curved to form concave faces, the members each projecting above the recess and having a longitudinal flange to overhang the recess, means on one member for attaching thereto a support, the insert comprising an elongated block of carbon positioned in the recess and having opposite side walls with the faces thereof curved to form convex surfaces corresponding to the said concave faces on the members, the upper surface of the insert being grooved longitudinally to receive a trolley wire, the projecting portions of the said side walls of the members and the upper surface of the insert forming a groove to resist dewirement of the shoe as it moves along the trolley wire, the curved faces of the members and the insert coacting to prevent longitudinal movement of the insert relative to the holder when the members are in clamping relation with the insert.

2. A current collector shoe comprising, an elongated metal holder having spaced walls and flanges and an elongated recess between the walls, a carbon insert positioned in the recess between the walls to engage a trolley wire, the flanges and insert forming a groove to receive the trolley wire and resist dewirement of the shoe, the upper surface of the insert being longitudinally grooved to receive the trolley wire and guide the shoe, the longitudinal inner faces of the recess being longitudinally concave and the side faces of the insert being correspondingly longitudinally convex, the said convex and concave faces cooperating to hold the insert against longitudinal movement relative to the holder when clamped between the said walls, and means to draw the said curved cooperating faces into engagement.

3. A current collector shoe comprising, an elongated metal holder having spaced side and end walls and a longitudinal recess between the walls, an insert positioned in the recess, the inner surface of the side walls of the recess forming bearing surfaces curved longitudinally and the side surfaces of the insert forming bearing surfaces curved longitudinally and conforming to the curvature of the recess surfaces and means to draw the bearing surfaces on the holder into engagement with the adjacent bearing surface on the insert whereby the parts of the insert are held against relative longitudinal movement should the insert rupture.

4. A current collector shoe comprising, an elongated metal holder formed of a pair of members and having an elongated recess with longitudinally concave side bearing faces, an insert positioned in the recess and having longitudinally convex side bearing faces curved to conform to the concave faces and arranged to cooperate therewith to hold the insert against longitudinal movement relative to the holder when the said faces on the insert are gripped between the said faces on the holder and means to draw the faces into cooperative gripping relation.

5. A current collector shoe comprising, an elongated metal holder provided with upstanding side walls and an elongated recess, the inner face of the side walls of the recess constituting bearing surfaces, an insert positioned in the recess, the insert having side bearing surfaces engaged by the side bearing surfaces of the recess, the recess and insert having their greatest width at a point intermediate their ends and the said bearing surfaces tapering from said point of greatest width to a narrower width at their ends whereby longitudinal shifting of the insert relative to the holder is prevented.

6. A current collector shoe comprising, an elongated metal holder provided with upstanding side walls and an elongated recess therebetween, an insert positioned in the recess, the side faces of the recess being concave in a longitudinal direction and concave in a direction at right angles thereto, the side faces of the insert being convexed corresponding to and engaged by the side faces of the recess, whereby the insert and the holder are held against movement longitudinally and transversely in a vertical direction relative to each other.

7. A current collector comprising, an elongated metal holder provided with laterally adjustable upstanding side walls and an elongated open top and open bottom recess, the inner face of the side walls of the recess constituting bearing surfaces, an insert positioned in the recess, the insert having side bearing surfaces engaged by the side bearing surfaces of the recess, the recess and insert having their greatest width at a point intermediate their ends and the said bearing surfaces tapering from said point of greatest width to a narrower width at their ends whereby longitudinal shifting of the insert relative to the holder is prevented, means on each side wall to engage the insert to prevent upward displacement of the insert, a support for the holder and means on one of the parts to cooperate with the other part to detachably secure the holder and support together.

8. A current collector shoe comprising, an elongated metal holder provided with an elongated recess having side faces, an insert positioned in the recess and comprising a block of current conducting material substantially filling said recess, the insert varying in width between its side faces, the maximum width being adjacent the longitudinal center of the insert, the insert being clamped in position between the side faces of the recess.

9. An insert for use in a metallic holder of a current collector shoe comprising, an elongated block of frangible current conducting material having upper and lower faces and the upper face provided with a longitudinal groove of less width than that of the insert, the block varying in width between its side faces from its maximum width intermediate the ends of the block to its minimum width adjacent the ends thereof.

10. An insert for use in a metallic holder of a current collecting shoe comprising, an elongated block of current conducting material having upper and lower and side faces, the block varying in width between the side faces, the greatest width being intermediate its ends and its minimum width adjacent its ends.

11. An insert for a current collector shoe comprising, an elongated body of current conducting material having its side faces convexly curved in a longitudinal direction.

12. An insert for a current collector shoe comprising, an elongated body of current conducting material varying in width between its side faces, the maximum width being adjacent the longitudinal center of the insert.

13. An insert for a current collector shoe comprising, an elongated body formed of a mixture of carbon and metal to a predetermined shape which is wider adjacent the longitudinal center than at the ends and having a surface with a longitudinal groove therein adapted to receive and slide along a trolley wire.

14. An insert for use in a metallic holder of a current collecting shoe comprising, an elongated block of frangible current conducting material having side faces adapted to be clamped by the holder to retain the insert in position and a coating of metal integrally united to the side faces of the insert and forming a metal-to-metal contact between the insert and its holder and holding the parts of the insert in their original relative positions in case the insert while in a fractured condition is removed from the holder.

15. An insert-holder for a current collector shoe comprising, a metallic rectangular frame provided with a laterally adjustable side wall and having an elongated open top recess to receive an insert, the width of the recess between the side walls of the frame tapering from its maximum width intermediate the ends of the recess to its minimum width at the ends thereof and means to effect a clamping engagement between the recess side walls and the side walls of the insert.

16. An insert-holder for a current collector shoe comprising, a metallic frame having spaced side walls and an elongated recess between the walls to receive a "boat-shaped" insert, the recess varying in width between its ends, the maximum width being intermediate the ends of the recess, means associated with the frame whereby the insert may be secured in the recess and means to attach the holder to a support.

17. A current collector shoe to slide along a trolley wire comprising an elongated insert of current conducting material having a surface arranged to engage with the trolley wire, the insert varying in width between its side faces, the greatest width being intermediate its ends and its minimum width being adjacent its ends, and means to mount the insert on a support comprising an adjustable metal frame arranged to receive the insert and grip the side walls thereof to hold the insert against longitudinal movement relative to the support and means for attaching the frame to a support.

18. A current collector shoe comprising a metal frame having an elongated recess to receive an insert, laterally adjustable side walls forming the side walls of the recess to grip the insert, the opposite longitudinal side walls of the recess having tapering faces forming the side faces of the recess which is of greater width intermediate the ends thereof than at the ends thereof, an insert of current conducting material positioned in the recess and having one face exposed to contact with a trolley wire, and means to draw the side walls inwardly to clamp the insert.

19. An insert for use in a holder comprising, an elongated block of current conducting material of substantially rectangular cross-section and means on one of the side faces of the insert intermediate its ends to engage with and to cooperate with means on the holder to resist longitudinal movement of the insert relative to the holder, the width of the insert at said means being greater than the width at other points along the insert.

20. An insert-holder for a current collector shoe comprising, a metallic rectangular frame having an elongated recess to receive an insert and also having laterally adjustable side walls to grip the insert, the opposite longitudinal side walls of the recess having concave faces forming the side faces of the recess which is of greater width intermediate the ends of the recess than at the ends thereof.

21. An insert for use in a current collector holder having flanges projecting above the insert, comprising an elongated body of carbonaceous material interspersed with metal, the body varying in width between its side faces for the purpose described, the maximum width being at some point intermediate the ends of the body, the body having a surface other than the said side surfaces provided with a longitudinal groove therein of less width than that at any point between the side faces adapted to receive and slide along a trolley wire and center the wire relative to the said flanges.

EDMUND C. RYAN.